G. R. BARKER.
Car Starter.
No. { 2,283, 33,287. }
Patented Sept. 17, 1861.
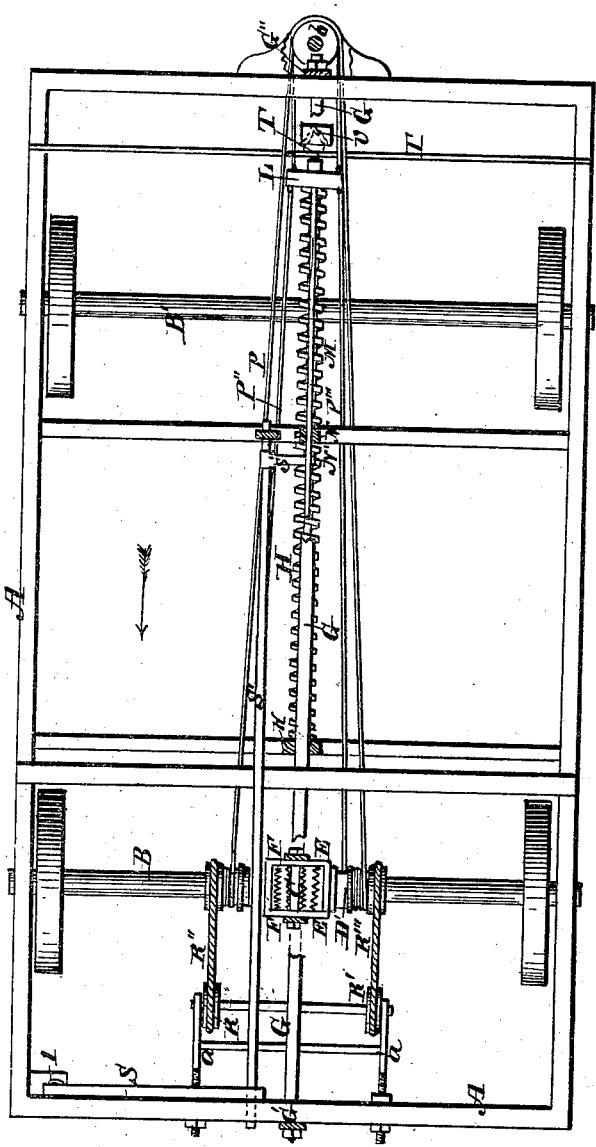
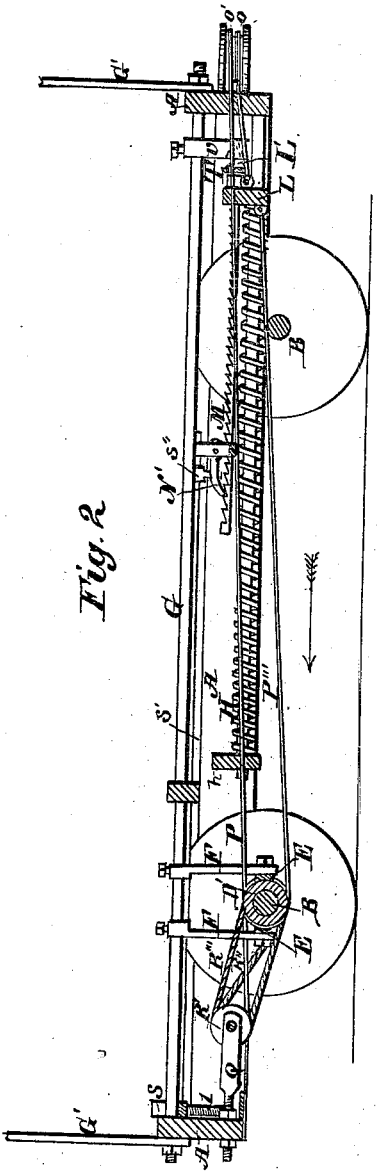
Witnesses:
Inventor
George R. Barker

UNITED STATES PATENT OFFICE.

GEORGE R. BARKER, OF GERMANTOWN, PENNSYLVANIA.

IMPROVEMENT IN BRAKES FOR HORSE-CARS.

Specification forming part of Letters Patent No. 33,287, dated September 17, 1861.

*To all whom it may concern:*

Be it known that I, GEORGE R. BARKER, of Germantown, in the city of Philadelphia and State of Pennsylvania, have invented a new and useful Improvement in Horse-Cars for Railroads; and I do hereby declare that the following is a full, clear, and exact description of the construction and operation of the same, reference being had to the annexed drawings, making a part of this specification, in which—

Figure 1 represents a plan, and Fig. 2 a sectional side view, of the same applied.

My invention has for its object the relieving of the horses of city-railroad passenger-cars from the usual excessive straining incident to the starting of the same when loaded; and it consists in the hereinafter described and specified arrangement of devices in combination with a car, whereby at the pleasure of the driver the power derived from the momentum of the car in arresting its progress is in a peculiar manner caused to be accumulated or retained and subsequently expended in starting it.

In the drawings, A represents the platform-frame of a car, and B B' its axles and wheels.

C D D' represent a double clutch secured to one of the axles B, the part C being fixed and the parts D D' being loose thereon, and the latter D D' connected together by means of a bridle E E, which is operated through the arms F F of the bar G, which extends through the whole length of the car-frame A, and is fitted with a hand-operating lever G' at one or both ends, so as to be within convenient command of the driver.

H is a spiral spring arranged around a fixed cylindrical bar I, so as to bear with its one end against a fixed support K on the frame A, while its opposite end bears against a block L, which is adapted to slide on the said bar I in a substantial manner without turning thereon.

M is a rack with ratchet-teeth, which is fixed by one of its ends to the said block L, and is held so that it may be slid along longitudinally above the spring H by means of a supporting-guide N.

N' is a pawl turning in the said guide N, which gears into the teeth of the rack M in the usual well-known manner of a rack and pawl.

O O' are two horizontally-placed pulleys, around which two chains P P', respectively, pass, one end of each of the said chains P P' being attached securely to the block L, while the other end is attached to and wound several times around the respective cylinders of the double clutch D D', substantially as seen in the drawings.

P'' P''' are two shorter chains, which directly connect the said cylinders D D' to the block L, as seen in the drawings.

Q is a frame adjustably attached to the platform-frame A, and carries a shaft having two grooved pulleys R R' fixed thereon, so as to correspond with like grooves in the cylinders D D', and the said pulleys and cylinders are connected by the respective ropes or bands R'' R''', the one rope or band R'' being crossed.

S is a foot-lever, which is supported in a horizontal position and within reach of the driver by means of a spring 1, and is also fixed at one end to an operating-rod S', that has a short arm S'', attached so as to extend directly across and beneath the pawl N', and in contact therewith. A like lever is intended to be applied, in the same manner, at the opposite end of the car, in connection with a like rod and arm under the pawl; but these are not shown in the drawings.

The block L, when the spring H is extended, abuts against a spring-bar T, which is fast on the frame A, and has a short conical block T' fixed thereto, whose apex is within a roomy hole in an arm U, that is fixed on the long rod G, substantially as seen in Fig. 2.

Operation: Supposing the car to be moving in the direction of the arrows and the driver wishes to avail himself of the advantages of the invention, he presses the hand-lever G, to the right and thus forces the loose cylinder D of the clutch into gear or frictional contact with the fast cylinder C on the axle B, thus causing it to be rotated with and by the axle, so as to wind the shorter chains P'' around the cylinder and thereby draw forward the block L so as to compress the spring H until the latter arrests the rotary motion of the said axle, the rack M at the same time being moved forward thereby and the pawl N' holding the said spring H in its compressed state. The driver now turns back the hand-lever G' into its first or normal position, and thus releases the loose cylinder D from its connection with the fast cylinder C. The chains P P' having, respectively, their one end wound around the cylinders D D', while the other ends are passed around the pulleys O O' and connected to the block L, the winding of the shorter chains P'' P''' necessarily causes a corresponding unwinding of the chains P P', and this effect will result in like manner if the car be run in the opposite direction, and whether the axle B be rotated by the momentum of the car, or afterward by the reaction of the spring, and the cylinder D being in connection with the shaft which carries the two pulleys R R', through the cross belt or rope R'', and the said shaft being also in connection with the cylinder D', through the belt R''', a counter strain upon the axle and clutch-cylinders D D' is effected against the direct strain exerted thereon by the spring H, and thus also the friction which occurs between the said axle and the clutch-cylinders D D' during the action and reaction of the spring thereon through the chains is in a great measure relieved. Supposing the car now to be at rest and that it is desired to aid the horses in starting it along the track, the driver has only to move the lever G, so as to bring the loose cylinder D' into gear with the fast cylinder C, and then to release the rack H by placing his foot upon and pressing down the lever S, so as to cause the arm S'' of the rod S' to lift the pawl N', when the spring H, reacting, forces back the block L, which, through the chain P''' and cylinder D', gives the required forward rotary motion to the axle B, and consequently a forward motion to the car. As the block L, from the reaction of the spring H, comes in contact with the spring-bar T, it forces the conical block T' into the hole in the arm U, and thus, acting like a cam, causes the arm U to slide laterally and return to its vertical or normal position, and consequently to release the loose cylinder D' from its connection with the fast cylinder C, so as to leave the axle B entirely free from gear with the clutch.

Having thus fully described my improvement and shown its utility, what I claim as new therein of my invention, and desire to secure by Letters Patent, is confined to the following, viz:

1. The combination and arrangement of the operating-bar G with its arms F F and bridle E E, the double clutch C D D' on the axle, the chains P'' P''', the sliding block L, spring H, the rack M, and pawl N', the operating-bar S', with its foot-lever S and arm S'', the chains P P', and pulleys O O', the same being constructed and applied to operate together substantially in the manner described, and for the purpose set forth.

2. The described arrangement of the adjustable pulleys R R' and ropes R'' R''', in combination with the clutch-cylinders D D', as described, and for the purposes set forth.

3. The arrangement of the conical block $T^2$ or its equivalent so as to operate, in combination with the block L, upon the arm U, substantially in the manner described, and for the purpose specified.

GEORGE R. BARKER.

Witnesses:
BENJ. MORISON,
CHAS. E. MORRIS.